(12) United States Patent
Maric et al.

(10) Patent No.: US 12,140,770 B2
(45) Date of Patent: Nov. 12, 2024

(54) HEAD-MOUNTED ELECTRONIC DEVICE

(71) Applicant: Apple Inc., Cupertino, CA (US)

(72) Inventors: Ivan S. Maric, Campbell, CA (US); Aidan N. Zimmerman, Poway, CA (US); Brian Baillargeon, Redwood City, CA (US); Evan D. Christensen, San Jose, CA (US); Jason C. Sauers, Sunnyvale, CA (US); Jia Tao, San Jose, CA (US); Phil M. Hobson, Menlo Park, CA (US); Sivesh Selvakumar, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/480,958

(22) Filed: Oct. 4, 2023

(65) Prior Publication Data

US 2024/0027778 A1    Jan. 25, 2024

Related U.S. Application Data

(63) Continuation of application No. 17/185,715, filed on Feb. 25, 2021, now Pat. No. 11,815,693.

(Continued)

(51) Int. Cl.
*G02B 27/01* (2006.01)
*G02C 5/02* (2006.01)
*G02C 9/00* (2006.01)

(52) U.S. Cl.
CPC ........... *G02B 27/0176* (2013.01); *G02C 5/02* (2013.01); *G02C 9/00* (2013.01); *G02B 2027/0178* (2013.01)

(58) Field of Classification Search
CPC ............ G02B 27/0176; G02B 27/0172; G02B 2027/0178; G02B 2027/0132; G02C 5/02; G02C 9/00; G06F 1/20; G06F 3/011
(Continued)

(56) References Cited

U.S. PATENT DOCUMENTS 5,179,459 A * 1/1993 Plesinger .............. G02F 1/1347
349/122
5,703,605 A 12/1997 Takahashi et al.
(Continued)

FOREIGN PATENT DOCUMENTS

CN        2724027 Y    9/2005
CN        2819243 Y    9/2006
(Continued)

*Primary Examiner* — William R Alexander
(74) *Attorney, Agent, or Firm* — Treyz Law Group, P.C.; G. Victor Treyz; Jinie M. Guihan

(57) ABSTRACT

A head-mounted device may have a head-mounted housing. The housing may include a chassis with left and right openings that overlap respective left and right optical modules that present images eye boxes. Each optical module may have a lens and display that presents an image through the lens. The chassis may have an inner frame and outer frame. A middle portion of the chassis may form a stiffened nose bridge structure. Components in the housing such as a display, a fan housing, a heat sink layer, optical module guide rods, and a rear cover may span the width of the housing and may be attached to edge portions of the chassis, thereby forming a box-shaped structure that provides rigidity and helps prevent housing deformation.

20 Claims, 13 Drawing Sheets

Related U.S. Application Data

(60) Provisional application No. 63/012,815, filed on Apr. 20, 2020.

(58) Field of Classification Search
USPC .......................................................... 351/129
See application file for complete search history.

(56) References Cited

U.S. PATENT DOCUMENTS

| | | |
|---|---|---|
| 9,097,891 B2 | 8/2015 | Border et al. |
| 9,151,954 B2 | 10/2015 | Magyari et al. |
| 9,904,358 B2 | 2/2018 | Rubin et al. |
| 10,261,555 B1 | 4/2019 | Cooper et al. |
| 10,539,787 B2 | 1/2020 | Haddick et al. |
| 11,025,892 B1* | 6/2021 | Aman ................... H04N 21/458 |
| 11,462,940 B2 | 10/2022 | Urbach et al. |
| 2006/0250572 A1 | 11/2006 | McNeal et al. |
| 2012/0069445 A1 | 3/2012 | Kobayashi |
| 2017/0038593 A1 | 2/2017 | Travers |
| 2017/0184863 A1* | 6/2017 | Balachandreswaran ..................... G02B 27/0176 |
| 2017/0192198 A1 | 7/2017 | Bristol et al. |
| 2018/0063307 A1* | 3/2018 | Hoellwarth ......... G02B 27/0176 |
| 2018/0267302 A1 | 9/2018 | Border et al. |
| 2020/0110449 A1* | 4/2020 | Chang ................ H05K 7/20172 |
| 2020/0192102 A1 | 6/2020 | Travers |
| 2020/0310119 A1 | 10/2020 | Lee et al. |
| 2020/0374509 A1 | 11/2020 | Sullivan et al. |
| 2021/0083512 A1 | 3/2021 | Urbach et al. |
| 2021/0302745 A1 | 9/2021 | Mutlu et al. |
| 2021/0325631 A1 | 10/2021 | Tao et al. |
| 2021/0325678 A1 | 10/2021 | Maric et al. |
| 2021/0333823 A1 | 10/2021 | Maric et al. |
| 2022/0223805 A1 | 7/2022 | Lee et al. |
| 2022/0299781 A1 | 9/2022 | Ran |
| 2022/0373799 A1 | 11/2022 | Wang |

FOREIGN PATENT DOCUMENTS

| | | |
|---|---|---|
| CN | 101474060 A | 7/2009 |
| CN | 105388614 A | 3/2016 |
| CN | 105934134 A | 9/2016 |
| CN | 106896504 A | 6/2017 |
| CN | 110244819 A | 9/2019 |
| CN | 110618531 A | 12/2019 |
| CN | 209821509 U | 12/2019 |
| CN | 210136443 U | 3/2020 |
| EP | 0821257 A2 | 1/1998 |
| WO | 2018219239 A1 | 12/2018 |
| WO | 2019087483 A1 | 5/2019 |

\* cited by examiner

HEAD-MOUNTED ELECTRONIC DEVICE

This application is a continuation of non-provisional patent application Ser. No. 17/185,715, filed Feb. 25, 2021, which claims the benefit of provisional patent application No. 63/012,815, filed Apr. 20, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. The displays may be housed in optical modules. Lenses may be mounted in the optical modules. Images on the displays may be viewed through the lenses.

SUMMARY

A head-mounted device may have a head-mounted housing. The housing may include a chassis with left and right openings. Left and right optical modules that are located respectively in the left and right openings may be used to present images to a user's eyes. Each optical module may have a lens and display that presents an image through the lens.

A middle portion of the chassis of the head-mounted housing may form a stiffened nose bridge structure. The stiffened nose bridge structure may include stiffening plates such as fiber-composite plates.

Components in the housing may be stacked to form a rigid box-shaped housing structure that helps prevent housing deformation. The stacked components may include a display on a front face of the housing and a cover on an opposing rear face of the housing. The display may have a rigid display cover layer that overlaps a display panel with an array of pixels. The cover may have a rigid frame that is coupled to the chassis.

The stacked components may also include components located between the display cover layer and the cover such as a fan housing structure and a heat sink layer. The fan housing structure and heat sink layer may have mating fastener openings that extend along peripheral edges of the fan housing structure and heat sink layer. Optical module guide rods may also extend across the chassis and may help provide the chassis with rigidity.

DETAILED DESCRIPTION

An electronic device such as a head-mounted device may have a front face that faces away from a user's head and may have an opposing rear face that faces the user's head. Optical modules may be used to provide images to a user's eyes. The positions of the optical modules may be adjusted to accommodate different user interpupillary distances. The head-mounted device may have actuators and optical module guide structures to allow the optical module positions to be adjusted.

Figure 1:
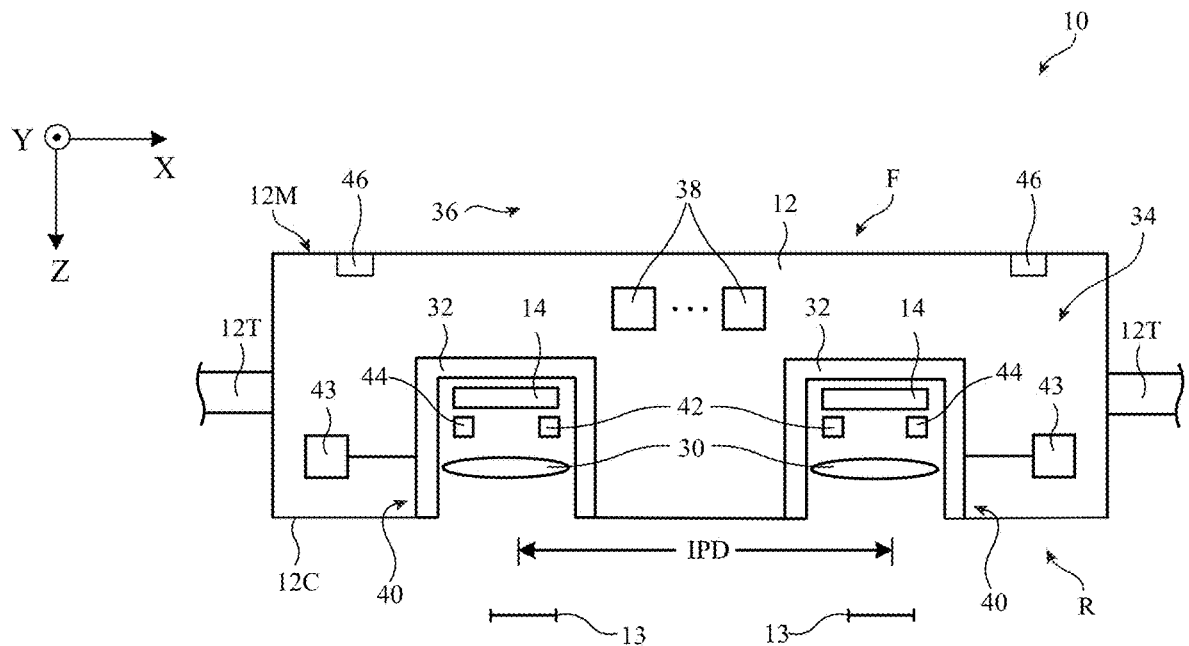
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. For example, forward-facing (front-facing) cameras may allow device 10 to monitor movement of the device relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eye boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving support structures (lens barrels) 32 relative to each other. Information on the locations of the user's eyes may be gathered using, for example, cameras 42. The locations of eye boxes 13 can then be adjusted accordingly.

Figure 2:
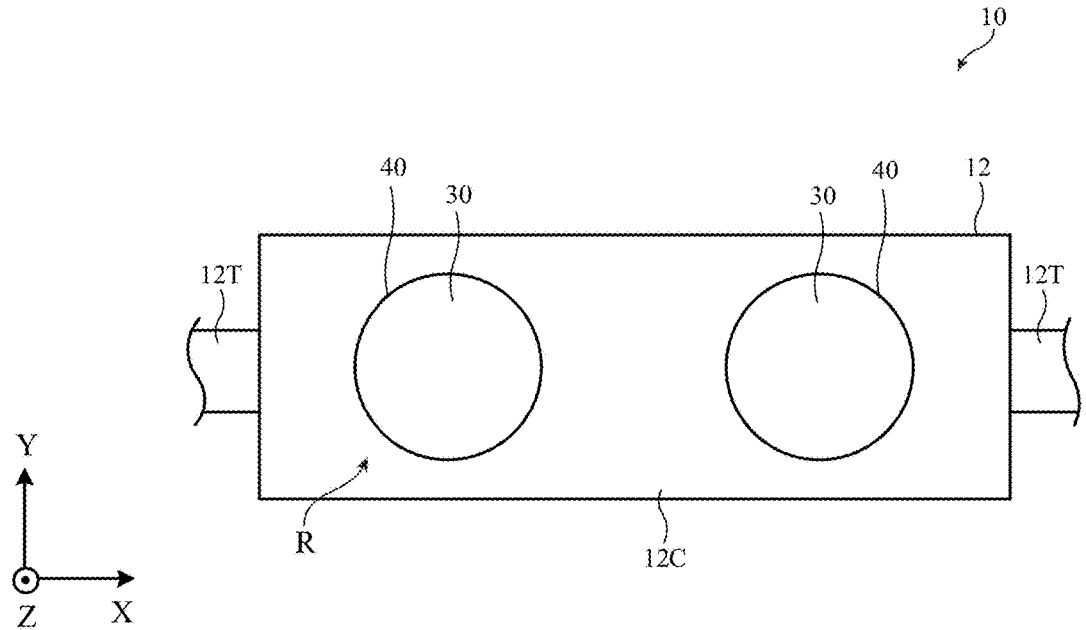
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
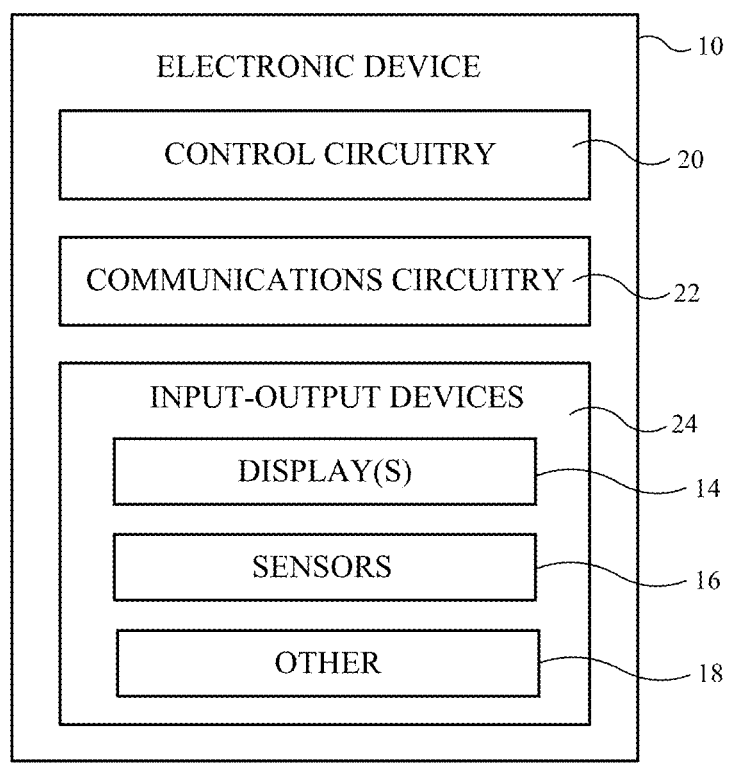
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Housing 12 may include support structures for optical modules 40 and other components of device 10. In an illustrative configuration, housing 12 may include a head-mounted support structure such as chassis (frame) 12I of FIG. 4. Chassis 12I may have support structures that run vertically and horizontally. For example, chassis 12I may have chassis nose bridge portion 12I-M in the middle of device 10. Nose bridge portion 12I-M is aligned with the user's nose bridge and may have an elongated shape that extends along the Y axis of FIG. 4. Chassis 12I may also have support structures that run horizontally across the top edge of housing 12 and along the bottom of edge of housing 12 and may have support structures that run vertically along the left and right edges of housing 12 (see, e.g., chassis peripheral edge portion 12I-E). These chassis structures form left and right chassis openings 50 in chassis 12I that receive and overlap left and right optical modules 40, respectively.

There may, in general, be one or more supporting members in device housing 12 that help create housing portion 12M and that support the components in housing portion 12M. As illustrated by the box shape of FIG. 4, multiple parallel components may be stacked between front face F and rear face R, thereby forming a mechanically sturdy housing shape for housing portion 12M. This helps prevent components from being damaged or becoming misaligned in the event that device 10 is inadvertently dropped.

Figure 4:
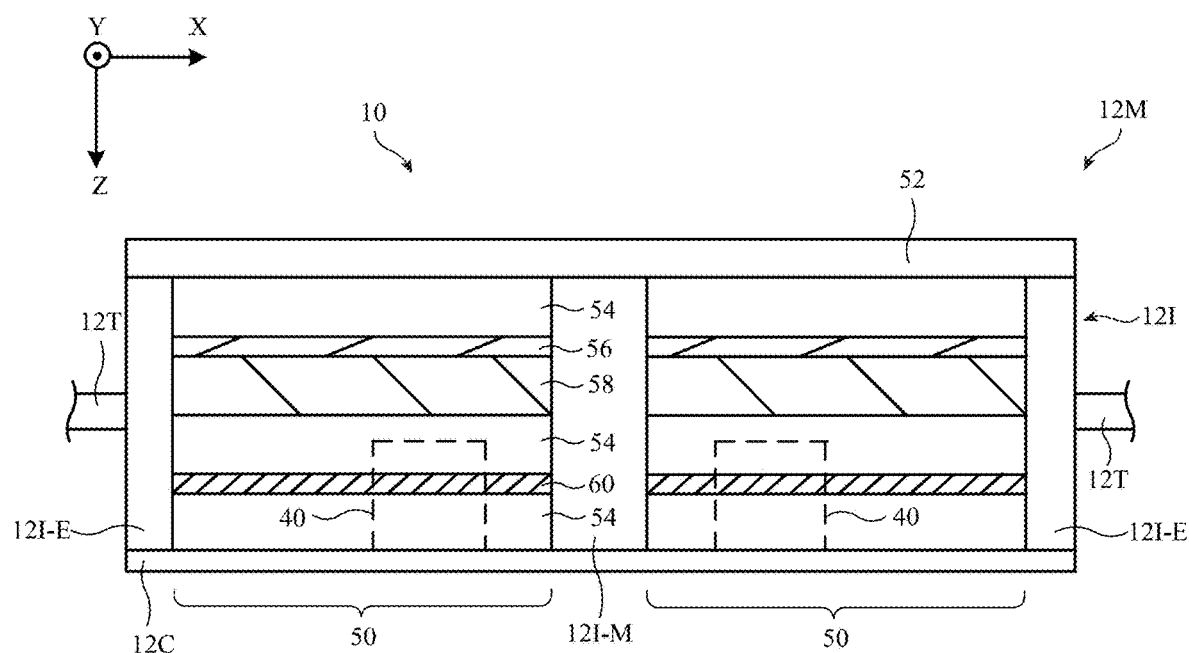
FIG. 4 is a cross-sectional top view of a portion of an illustrative head-mounted device in accordance with an embodiment.

The multiple parallel layers of device 10 of FIG. 4 may include, for example, structures (e.g., device components) that perform electrical functions, optical functions, thermal management functions, structural functions, and/or other functions. These components may include components such as display (display layer) 52, fan housing (fan housing layer) 56, heat sink (heat sink layer) 58, optical module guide structures such as guide rods 60, and cover 12C. Display 52, which may sometimes be referred to as a forward-facing or front-facing display may be viewed by the user when device 10 is not being worn (e.g., when device 10 is being held in the hand of a user) or may be viewed by people other than the user when the user is wearing device 10. Air gaps such as air gaps 54 may be located between the stacked structures of FIG. 4. For example, an air gap may separate display 52 from fan housing 56. Fan housing 56 and heat sink 58 may be joined together (e.g., using peripheral fasteners that pass through a series of peripheral mating fastener openings in housing 56 and heat sink 58, using an interlocking peripheral ridge and peripheral groove or other engagement structures, and/or using other attachment mechanisms) to form a fan and heat sink assembly. Air gaps 54 may separate this assembly from guide rods 60 and cover 12C. Guide rods 60 may be cylindrical in shape or may have other suitable shapes. There may be a pair of guide rods 60 on the left of device 10 to support a left-hand optical module 40 for lateral movement along the X axis of FIG. 4 and there may be a pair of guide rods 60 on the right of device 10 to support a right-hand optical module 40 for lateral movement along the X axis of FIG. 4. Optical modules 40 may have each have an upper guide rod opening for receiving a first guide rod and a lower guide rod opening for receiving a second guide rod.

The front and rear of device 10 may be planar and/or may have curved shapes. For example, one or more of the stacked structures of FIG. 4 may have a curved shape (e.g., a shape curved slightly about the Y axis and/or slightly curved about the X axis) to help accommodate the curved surface of a user's face when device 10 is being worn on the head of a user. The stacked layers of device 10 that are used in forming housing portion 12M of FIG. 4 may be rigidly coupled to chassis 12I-E and/or to each other. By incorporating spacing between stacked layers in the Z dimension of FIG. 4 (e.g., by ensuring that all of the stacked layers are not directly laminated on top of each other so that the thickness of housing portion 12M and device 10 along dimension Z is 3-30 mm, at least 4 mm, at least 6 mm, less than 25 mm, or other suitable size), a box shape of the type shown in FIG. 4 may be formed, which may help enhance the overall strength of device 10 without overly increasing device weight. To help further strengthen device 10, some or all of the layers of FIG. 4 may extend across the entire width and/or height of device (the entire lateral dimensions of device 10 along the X and Y axes of FIG. 4). For example, display 52, fan housing 56, heat sink 58, and cover 12C may extend over more or all of the area of front face F (and rear face R) of device 10 and may therefore be coupled between the left and right edge portions 12I-E of chassis 12I.

Chassis 12I may be formed from a single structural member or multiple frame structures that are attached together. Carbon-fiber composite material, other fiber-composite material (e.g., fiber composite material formed from glass fibers embedded in polymer), polymer without embedded fibers, metal, ceramic, glass, other materials, and/or combinations of these materials may be used in forming chassis 12I and the other structures of FIG. 4.

Figure 5:
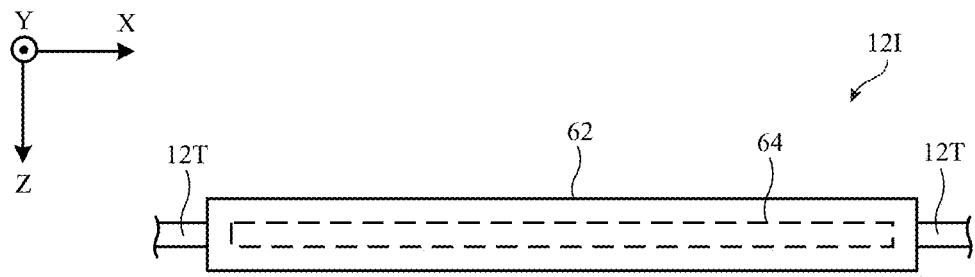
FIG. 5 is a top view of an illustrative chassis for a head-mounted device in accordance with an embodiment.

In an illustrative configuration shown in the top view of FIG. 5, chassis 12I is formed from first and second chassis members that are attached to each other. As shown in FIG. 5, for example, chassis 12I may include an inner frame (inner chassis portion) such as inner frame 64 that is attached to an outer frame (outer chassis portion) such as outer frame 62.

Figure 6:
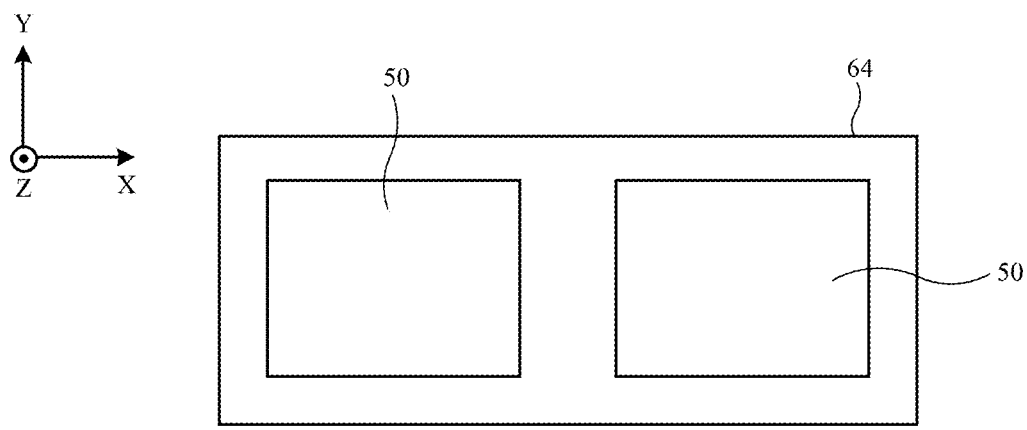
FIG. 6 is a rear view of an illustrative inner frame for the chassis in accordance with an embodiment.

FIG. 6 is a rear view of inner frame 64, showing how inner frame 64 may have left and right openings 50 that are configured to overlap corresponding left and right optical modules 40. The size of openings 50 may be sufficient to allow modules 40 to be moved towards and away from each other to accommodate different user interpupillary distances.

Figure 7:
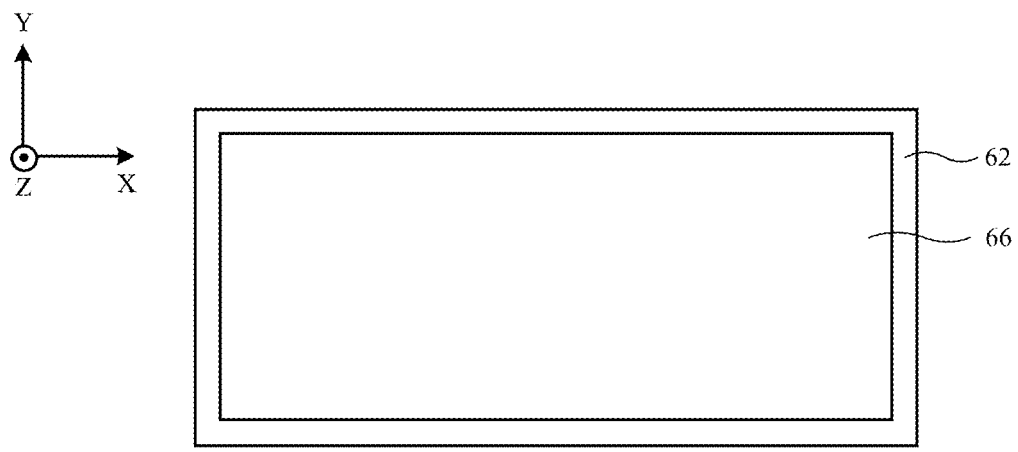
FIG. 7 is a rear view of an illustrative outer frame for the chassis in accordance with an embodiment.

FIG. 7 is rear view of outer frame 62 showing how outer frame 62 may have a single opening 66 that is sufficiently large to overlap both of openings 50 of inner frame 64 when (as an example). Inner frame 64 and outer frame 62 may have mating openings for screws or other fasteners, and/or may have engagement features that facilitate rigid attachment of frames 64 and 62 together to form chassis 12I.

The rigidity of chassis 12I and therefore the ability of housing portion 12M to resist undesired deformation that could misalign components can be enhanced by incorporating stiffening structures into chassis 12I. Stiffening structures for device 10 may, as an example, include sheets of fiber-composite material (e.g., carbon-fiber plates), and/or other stiffening members. Stiffening members such as these, which may sometimes be referred to as stiffeners or stiffening plates, may be planar members, may be curved sheets of material, and/or may be formed in other suitable shapes. Portions of chassis12I (e.g., portions of middle chassis portion 12I-M) may be configured to form one or more stiffening plates (e.g., polymer plates or fiber-composite plates that are integral portions of chassis portion 12I-M). One or more separate stiffening plates may also be attached to middle chassis portion 12I-M and/or other portions of chassis 12I to help selectively stiffen portions of chassis 12I.

As an example, stiffening plates can be attached to chassis 12I in the portion of chassis 12I (e.g., portion 12I-M) that is aligned with the bridge of a user's nose when device 10 is being worn by the user. In this way, the stiffening plates can form a locally stiffened central portion of chassis 12I that helps strengthen device 10, particularly in the middle of housing portion 12M where device 10 may be subjected to elevated bending and twisting forces.

Figure 8:
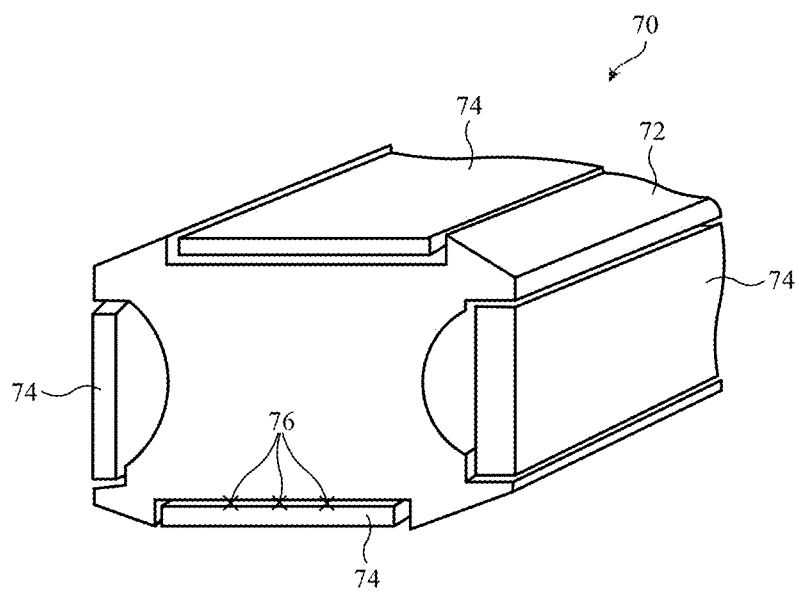
FIG. 8 is a perspective view of a portion of an illustrative nose bridge box structure in accordance with an embodiment.
Figure 9:
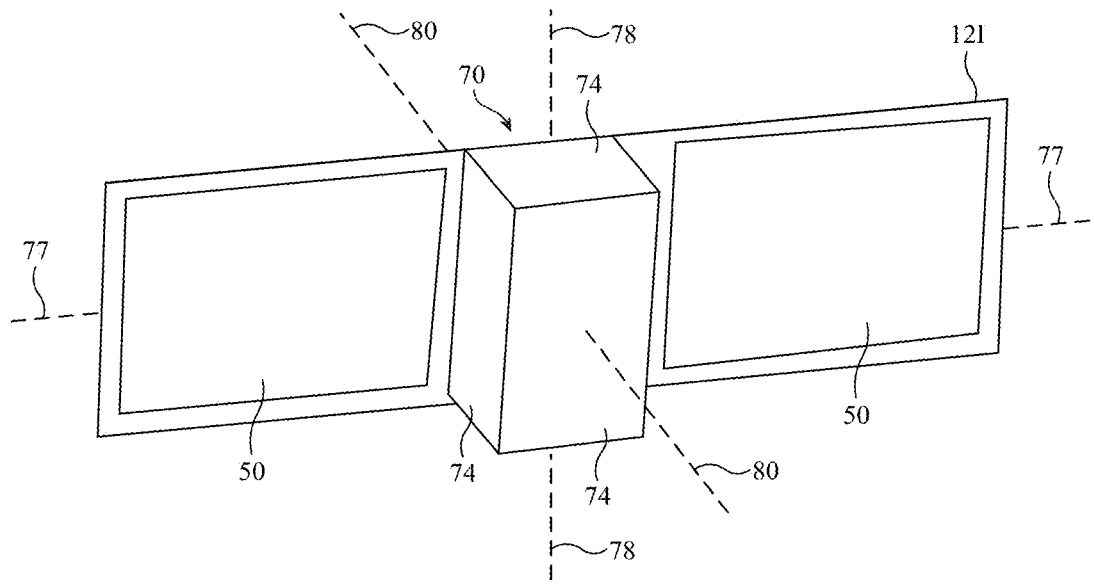
FIG. 9 is a rear view of an illustrative chassis with a nose bridge box in accordance with an embodiment.

Consider, as an example, illustrative stiffened chassis portion 70 of FIG. 8. Chassis portion 70 may include a chassis support structure such as support structure 72 (e.g., an integral part of chassis 12I) that is configured to form one or more integral stiffening plates and to receive additional stiffening plates 74. Plates 74 may, for example, be attached to structure 72 using adhesive 76 or other attachment mechanisms. The example of FIG. 8 involves the use of four stiffening plates 74 that, in combination with integral plates formed from portion 70, form stiffened box structure. Stiffened chassis portion 70 may, in general, have any suitable number of stiffening plates 74 and/or stiffening plates formed from integral portions of chassis 12I (e.g., the number of plates 74 may be one, at least two, at least three, at least four, at least five, at least six, fewer than 10, etc. and the number of integrally formed stiffening plates may be one, at least two, at least three, at least four, at least five, at least six, fewer than 10, etc.). Each stiffening plate may have a rectangular outline, an outline with straight edges and/or curved edges, etc. Each stiffening plate (e.g., see, e.g., stiffening plates 74 of FIG. 8) may have a thickness of 0.05 mm to 3 mm, at least 0.1 mm, less than 1 mm, or other suitable thickness. Stiffening plates 74 may be planar and/or may have portions with curved cross-sectional profiles. In the example of FIG. 9, stiffening plates 74 have been attached to chassis 12I to form a rigid six-sided box. This box, which may include stiffening plates with curved cross-sectional profiles and/or curved edges, may form a nose bridge stiffening structure (sometimes referred to as a nose bridge box or stiffened nose bridge chassis portion). By placing the nose-bridge box (e.g., stiffened chassis portion 70 of FIG. 9) in the center of chassis 12I, the nose-bridge box may be used to help chassis 12I resist bending and/or twisting about horizontal axis 77, vertical axis 78, and/or front-back axis 80 (as examples).

Figure 10:
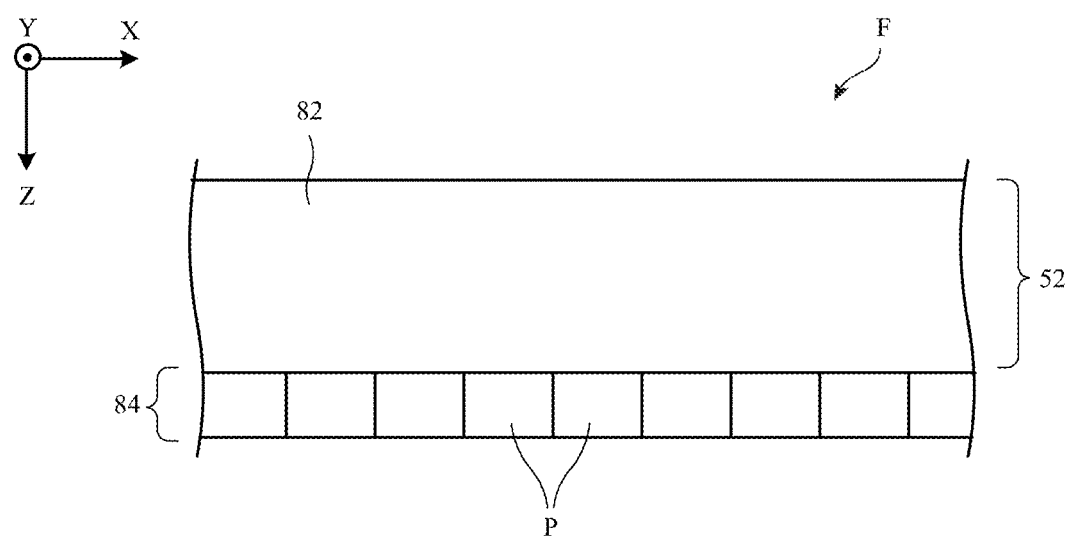
FIG. 10 is a top view of a portion of an illustrative front-facing display in accordance with an embodiment.

Front-facing display 52, which may cover front face F of housing portion 12M, may help strengthen housing 12M. A cross-sectional top view of a portion of display 52 is shown in FIG. 10. As shown in FIG. 10, display 52 may include pixels P. Pixels P may be arranged in a pixel array such as pixel array 84 to present images on front face F. One or more display layers such as protective display cover layer 82 may overlap pixel array 84. Display cover layer 82 may be formed from a transparent material such as transparent polymer, transparent glass, transparent ceramic, transparent crystalline material such as sapphire, and/or other transparent material to allow the image on pixel array 84 to be viewed through layer 82. The thickness of layer 82 may be, as an example, at least 0.1 mm, at least 0.3 mm, at least 0.5 mm, at least 0.7 mm, less than 2.5 mm, or other suitable thickness. By forming display cover layer 82 from a rigid material that is coupled between the left and right edges and between the upper and lower edges of chassis 12I, display cover layer 82 may form an outer structural layer in the box-shaped housing structure forming housing portion 12M.

Figure 11:
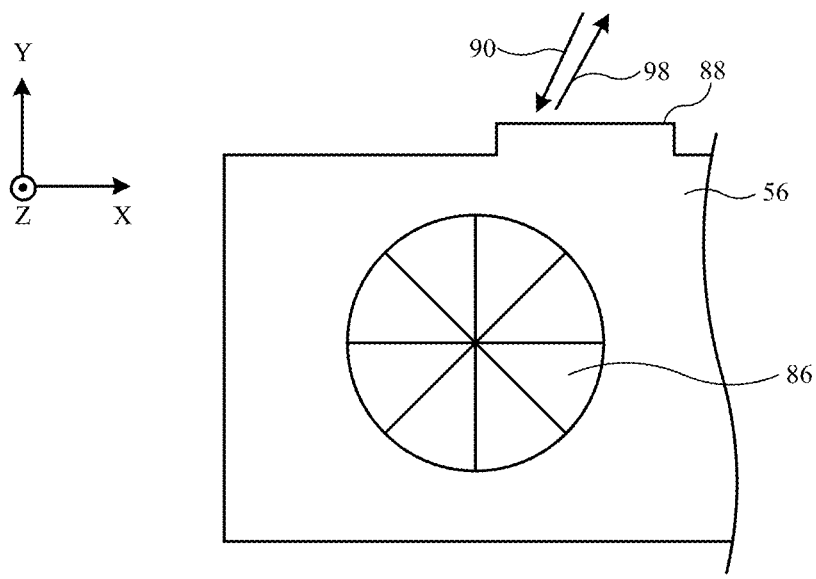
FIG. 11 is a rear view of a portion of an illustrative fan housing in accordance with an embodiment.

FIG. 11 is a rear view of an illustrative fan housing structure. As shown in FIG. 11, fan housing 56 may be configured to receive fan 86. During operation, fan 86 may rotate and force air through opening 88 (e.g., in direction 90 or in direction 98). This forces cooling air past heat sink 58, and thereby helps cool electrical components coupled to heat sink 58 (e.g., integrated circuits, etc.).

Figure 12:
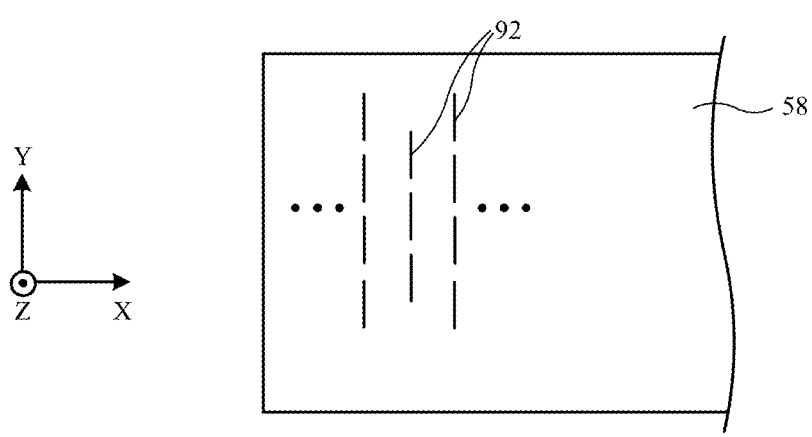
FIG. 12 is a rear view of a portion of an illustrative heat sink in accordance with an embodiment.
Figure 13:
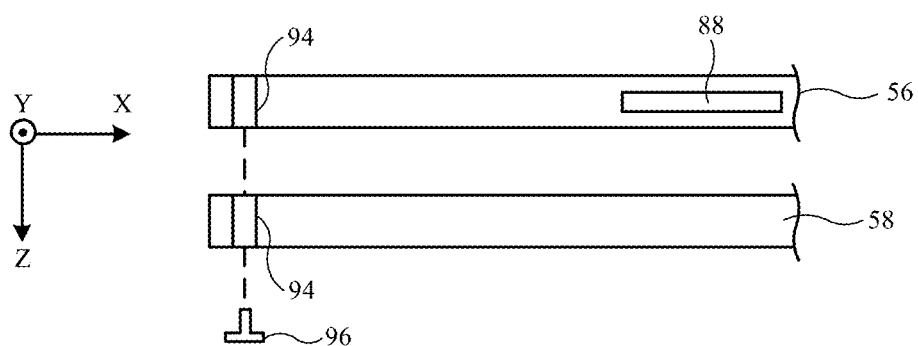
FIG. 13 is a top view of the illustrative fan housing and heat sink structures of FIGS. 11 and 12 in accordance with an embodiment.

FIG. 12 is a rear view of an illustrative heat sink. As shown in FIG. 12, heat sink 58 may have heat exchange structures such as fins 92. Heat sink 58 may be formed from a material such as metal or other material with a high thermal conductivity. The metal forming heat sink 58 may help provide heat sink 58 with structural rigidity. Heat sink 58 and fan housing 56 may extend across most or all of the width and height of housing portion 12M and may be coupled to chassis 12I around their peripheral edges, thereby helping to strengthen housing portion 12M. As shown in FIG. 13, heat sink 58 and fan housing 56 may have fastener openings such as openings 94 that are configured to receive fasteners such as screw 96. Openings 94 may be through-hole openings and/or threaded openings and may be configured so that fasteners 96 may be used to rigidly attach heat sink 58 and fan housing 56 together and, if desired, may be used to rigidly attach the assembly formed by heat sink 58 and fan housing 56 to chassis 12I.

Figure 14:
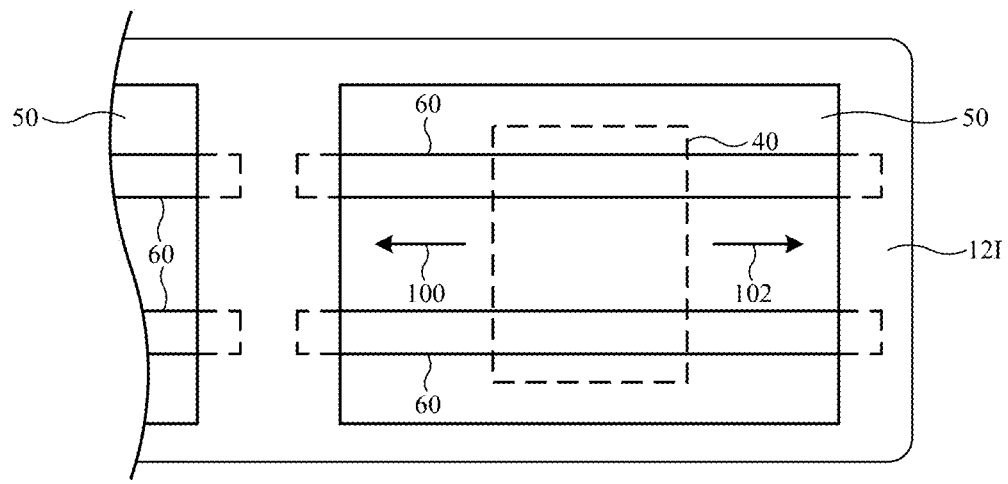
FIG. 14 is a rear view of a portion of an illustrative head-mounted device having repositionable optical modules supported by guide rods in accordance with an embodiment.

FIG. 14 is a rear view of a portion of chassis 12I showing how guide rods 60 may extend across openings 50 in chassis 12I to support and guide optical modules such as optical module 40. During adjustments to accommodate different interpupillary distances, optical modules such as module 40 of FIG. 14 may move outwardly (e.g., in direction 102) or inwardly (e.g., in direction 100) along guide rods 60.

Figure 15:
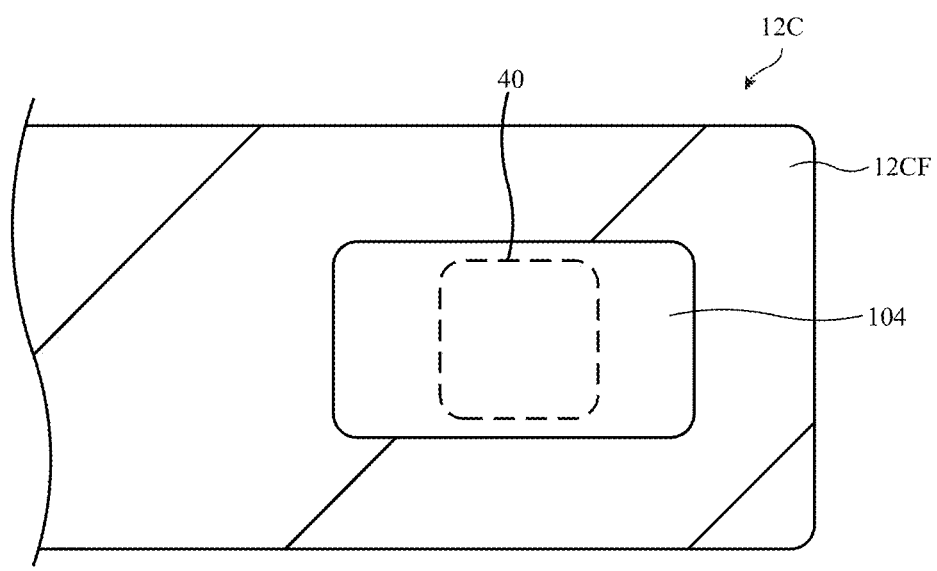
FIG. 15 is a rear view of a portion of an illustrative head-mounted device having a cover frame with an opening for an optical module in accordance with an embodiment.

FIG. 15 is a rear view of chassis 12I of FIG. 14 following attachment of a rigid portion of cover 12C. This rigid portion (e.g., cover frame 12CF of FIG. 15) may, as an example, be formed from polymer (e.g., structural plastic such as fiber-composite material containing carbon fibers, glass fibers, and/or other fibers embedded in polymer). By rigidly attaching rigid cover frame 12F to chassis 12I and/or other structural layers in the stack of layers forming housing portion 12M, the strength of portion 12M may be enhanced.

Figure 16:
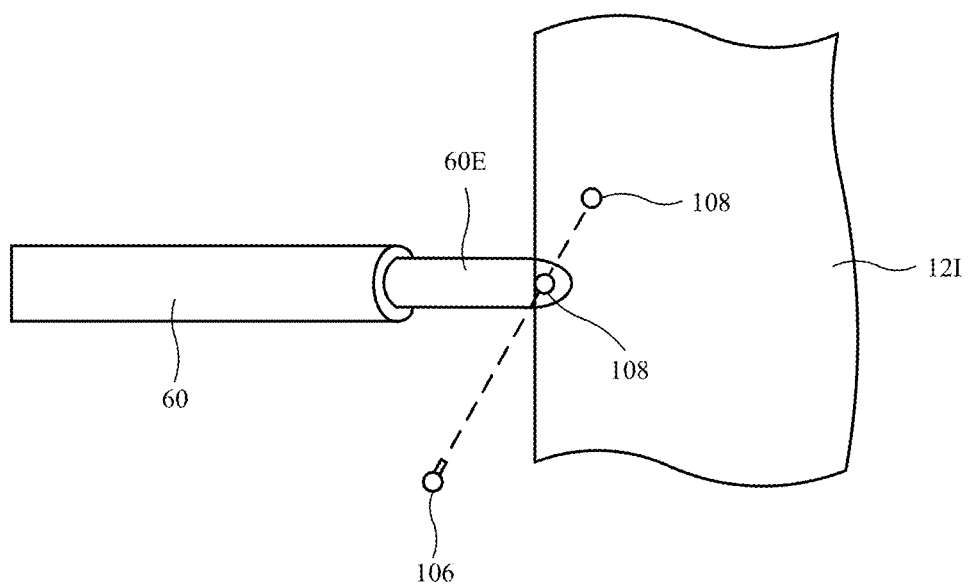
FIG. 16 is a perspective view of an illustrative guide rod being attached to a chassis in accordance with an embodiment.

FIG. 16 is an exploded perspective view of an illustrative guide rod 60 and an associated portion of chassis 12I to which guide rod 60 is being attached. In the example of FIG. 16, guide rod 60 has an end portion such as end cap 60E. End cap 60E may be formed from metal or other suitable material and may be attached within the opening of a metal-coated fiber-composite tube, a metal tube, or other rigid structure forming rod 60. Mating openings 108 in end cap 60E and chassis 12I may be configured to receive a screw or other fastener 106. Using fastener 106 or other attachment mechanisms, guide rods 60 such as rod 60 of FIG. 16 may be rigidly attached to chassis 12I, thereby enhancing the overall rigidity of chassis 12I and housing portion 12M.

Figure 17:
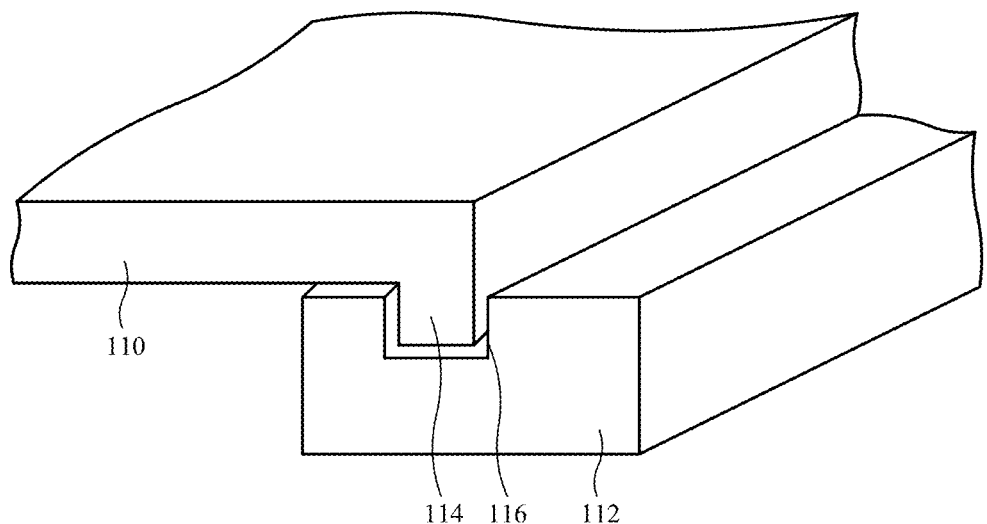
FIG. 17 is a perspective view of engagement structures that may be used to attach head-mounted device structures in accordance with an embodiment.

The structural layers in housing portion 12I may be attached to each other using any suitable attachment mechanisms (e.g., adhesive, fasteners such as screws, welds, brazed connections, mating engagement structures, etc.). In the example of FIG. 17, first structure 110 (e.g., heat sink 58 or other structure in housing portion 12M) is attached to second structure 112 (e.g., fan housing 56 or other structure in housing portion 12M). Engagement structures (sometimes referred to as engagement features or interlocking structures) may be incorporated into structures 110 and 112 to help attach structure 110 and 112 together. In the example of FIG. 17, structure 110 has protrusion 114 and structure 112 has mating recess 116. Protrusion 114 may, as an example, form a peripheral rib that runs along some or all of the peripheral edge of structure 110 (and therefore along some or all of the periphery of housing portion 12M when viewed from front face F). Recess 116 may form a mating peripheral groove that runs along some or all of the peripheral edge of structure 112. Adhesive and/or other attachment mechanisms (e.g., a series of fasteners that pass through a respective series of mating fastener openings distributed along the peripheral edges of structures 110 and 112) may be used to hold structures 110 and 112 together. The mating engagement structures of structures 110 and 112, fasteners, and/or other mechanisms may help rigidly couple structures 110 and 112 together and thereby strengthen housing portion 12M.

Figure 18:
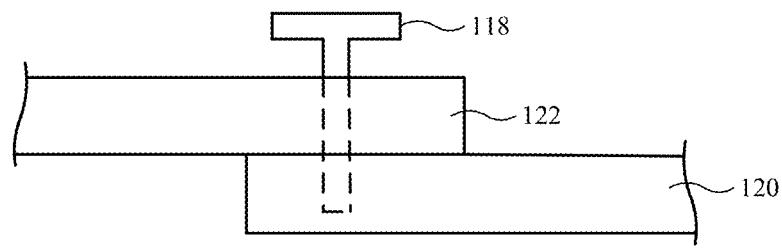
FIGS. 18, 19, and 20 are cross-sectional side views of illustrative head-mounted device attachment mechanisms in accordance with embodiments.
Figure 19:
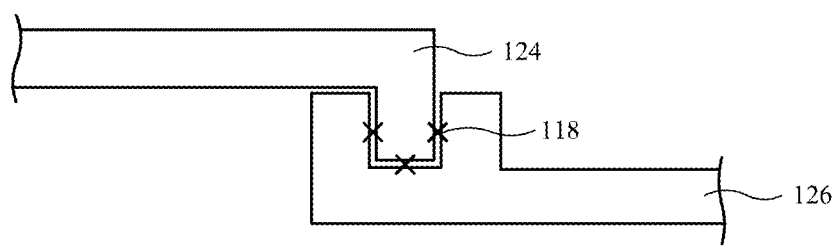
Figure 20:
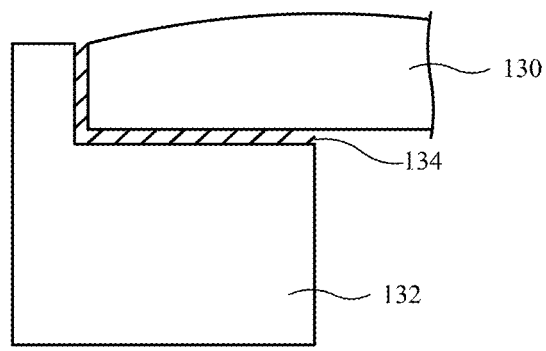

FIGS. 18, 19, and 20 are cross-sectional side views of structures in device 10 showing illustrative attachment mechanisms that may be used in joining the structures of housing portion 12M. The structures being joined may be, for example, structures in housing portion 12M (e.g., layered structures such as display 52, fan housing 56, heat sink 58, and cover 12C).

In the example of FIG. 18, fastener 118 (e.g., a screw) is being used to attach structure 122 to structure 120. The use of fastener-based attachment mechanisms such as the fastener-based arrangement of FIG. 18 may help avoid movement in joined structures (e.g., movement due to thermal expansion and contraction of adhesive, and/or other adhesive size changes), thereby ensuring rigidity and helping to minimize deformation in housing portion 12M.

In the example of FIG. 19, structures 124 and 126 are being joined by bond 128. Bond 128 may include a weld, a brazed connection, solder joints, and/or other joints. Press-fit connections between structures 124 and 126 may help join structures 124 and 126 to each other.

FIG. 20 shows how structures 130 (e.g., display cover layer 82 of FIG. 10) may be joined to structure 132 (e.g., chassis 12I) using adhesive 134. This connection may be made along the opposing left and right peripheral edges of chassis 12I and along the opposing upper and lower peripheral edge of chassis 12I. To help form a rigid connection, adhesive 134 may be a rigid polymer (e.g., an adhesive such as epoxy with a cured elasticity of at least 100 MPa, at least 500 MPa).

In general, any suitable attachment mechanisms may be used in joining the structural layers of housing portion 12M together. By using rigid attachment mechanisms, the overall resistance of housing portion 12M to deformation may be reduced.

Figure 21:
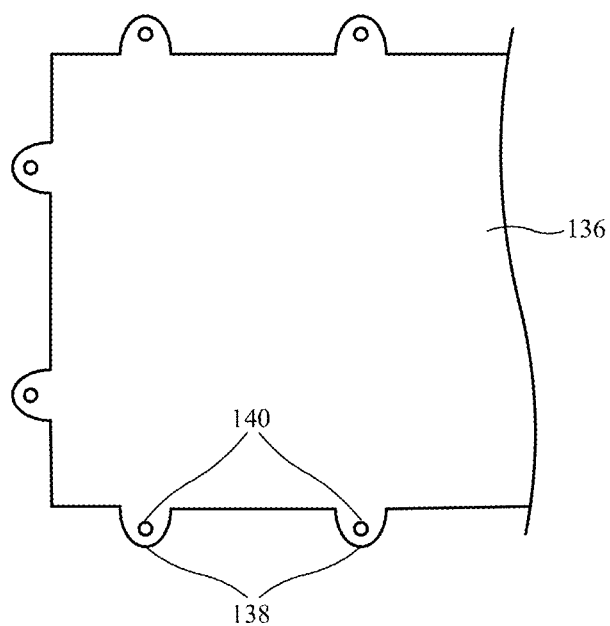
FIG. 21 is a rear view of a portion of an illustrative head-mounted device structure with peripheral openings for fasteners in accordance with an embodiment.

If desired, the structural layers of housing portion 12M (e.g., display 52, fan housing 56, heat sink 58, cover 12C, chassis 12I, etc.) may have a series of screw-hole openings or other fastener openings that run along some or all of the peripheral edges of the structural layers. This is illustrated by structural layer 136 of FIG. 21, which has a series of peripheral protrusions 138 with fastener openings 140 (e.g., screw-hole openings) that are arranged along the peripheral edge of layer 136. By distributing the fastener openings (or other attachment points) of the structural layers in this way, loads due to drop events and other stresses on the structures of housing portion 12M are spatially distributed. This helps reduce the maximum load experienced at any particular joint (e.g., at any particular fastener, etc.). In an illustrative configuration, chassis 12I, heat sink 58, and fan housing 56 each have a series of mating peripheral fastener openings running along some or all of the peripheral edges of these structures. Fasteners that pass through the openings in chassis 12I, heat sink 58, and fan housing 56 may be used to rigidly attach these structures together.

Figure 22:
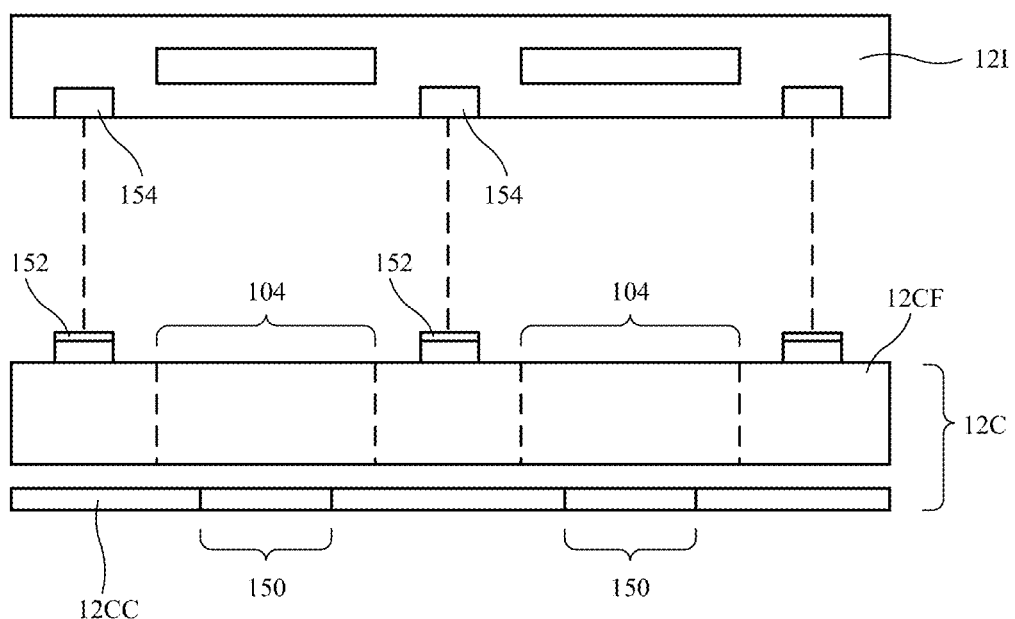
FIG. 22 is a top view of an illustrative head-mounted device chassis and cover in accordance with an embodiment.

As shown in FIG. 22, cover 12C may include a rigid frame (frame 12CF). Frame 12CF may be sufficiently rigid to serve as a structural layer in housing portion 12M (e.g., a rear layer in the box-shaped head-mounted housing for device 10). As shown in FIG. 22, cover 12C may include a cosmetic cover layer such as layer 12CC. Cover layer CC, which may be rigid or flexible, may be formed from a sheet of polymer, fabric, and/or other material that serves to hide internal components from view from the exterior of device 10. Cover layer CC may be attached to rigid cover frame 12CF using adhesive, fasteners, and/or other attachment mechanisms. Cover layer CC may have a pair of openings 150 that receive respective left and right optical modules 40. Cover layer CC may stretch, slide, and/or otherwise move to accommodate movement of optical modules 40. Openings 150 may overlap larger openings 104 in cover frame 12CF. Frame 12CF may have engagement structures such as hooked protrusions 152 that mate with corresponding engagement structures such as recesses 154 in chassis 12I. Hooked protrusions 152 and recesses 154 may be located along the peripheral edge of cover 12C and chassis 12I (e.g., along the left and right peripheral edges of cover 12C and chassis 12I, which are on opposing left and right sides of device 10 and along the upper and lower peripheral edges of cover 12C and chassis 12I, which are on opposing upper and lower sides of device 10). These engagement structures and/or other attachment mechanisms may help rigidly attach cover 12C to chassis 12I. The attachment of cover 12C (e.g., cover frame 12CF) to chassis 12I helps stiffen chassis 12I and thereby strengthens housing 12M.

By stacking multiple layers of components and rigidly interconnecting these components to form housing 12M as described in the foregoing embodiments, bending in housing 12M can be reduced, thereby helping to ensure that components such as optical modules front-facing cameras 46, and/or other optical components are not misaligned (e.g., components that are aligned with respect to each other may maintain that alignment within 0.2°, 0.1°, or other suitable misalignment tolerance due to the rigidity of housing portion 12M).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a first optical module comprising a first display;
a second optical module comprising a second display;
a third display;
a head-mounted housing configured to support the first, second, and third displays, wherein the head-mounted housing encloses a fan housing and a heat sink layer and wherein a fan in the fan housing forces air past the heat sink layer; and
a first pair of guide rods configured to support lateral movement of the first display and a second pair of guide rods configured to support lateral movement of the second display.

2. The head-mounted device of claim 1, wherein the third display is a front-facing display and the first and second optical modules are configured to present respective left and right images to left and right eye boxes.

3. The head-mounted device of claim 1, wherein the fan housing comprises an opening and the fan forces air through the opening.

4. The head-mounted device of claim 3, wherein the head-mounted housing has opposing front and rear faces, opposing left and right edges, and opposing upper and lower sides, and wherein the opening is adjacent to the upper side.

5. The head-mounted device defined in claim 4, wherein the heat sink layer comprises a metal member that extends from the left edge to the right edge.

6. The head-mounted device defined in claim 1, wherein the fan housing is attached to the heat sink layer with fasteners and wherein the fan housing and the heat sink layer have respective peripheral edges with openings that receive the fasteners.

7. The head-mounted device defined in claim 1, wherein the fan housing is attached to the heat sink layer with fasteners and wherein the fan housing and the heat sink layer have respective peripheral protrusions with openings that receive the fasteners.

8. The head-mounted device defined in claim 1, wherein the fan housing and the heat sink layer are separated by a first air gap from the third display and by a second air gap from the first and second displays.

9. A head-mounted device, comprising:
- left and right optical modules configured to present respective left and right images to left and right eye boxes and to emit light in a first direction;
- a forward-facing display configured to emit light in a second direction different than the first direction; and
- a head-mounted housing configured to support the left and right optical modules and the forward-facing display, wherein the head-mounted housing encloses a fan and heat sink assembly that is separated by an air gap from the forward-facing display.

10. The head-mounted device defined in claim 9, wherein the fan and heat sink assembly is separated by an additional air gap from the left and right optical modules.

11. The head-mounted device defined in claim 9, wherein the fan and heat sink assembly comprises a fan housing and a heat sink layer.

12. The head-mounted device defined in claim 11, wherein the fan housing is attached to the heat sink layer with fasteners and wherein the fan housing and the heat sink layer have respective peripheral protrusions with openings that receive the fasteners.

13. The head-mounted device defined in claim 9, further comprising guide rods configured to support lateral movement of the left and right optical modules.

14. The head-mounted device defined in claim 13, wherein the fan and heat sink assembly is separated from the guide rods by an additional air gap.

15. A head-mounted device, comprising:
- a head-mounted housing comprising a chassis with opposing front and rear faces, opposing left and right edges, and opposing upper and lower edges interposed between the left and right edges;
- a forward-facing display on the front face of the chassis and configured to emit light in a first direction, wherein the forward-facing display comprises a display cover layer coupled between the left and right edges and between the upper and lower edges; and
- left and right optical modules configured to present respective left and right images to left and right eye boxes through openings in the rear face of the chassis, wherein the left and right optical modules are configured to emit light in a second direction different than the first direction.

16. The head-mounted device defined in claim 15, wherein the display cover layer is coupled to the chassis using adhesive.

17. The head-mounted device defined in claim 15, further comprising a heat sink layer coupled to the left and right edges.

18. The head-mounted device defined in claim 15, further comprising a fan housing coupled to the left and right edges.

19. The head-mounted device defined in claim 15, further comprising optical module guide rods attached to the chassis.

20. The head-mounted device defined in claim 15, wherein the second direction is opposite the first direction.

* * * * *